(12) United States Patent
Avenel et al.

(10) Patent No.: US 6,407,677 B1
(45) Date of Patent: Jun. 18, 2002

(54) DEVICE FOR LOW-FREQUENCY COMMUNICATION BY MAGNETIC COUPLING

(75) Inventors: Jean-Jacques Avenel, Chennevieres/Marne; Virginie Tessier, Charenton le Pont, both of (FR)

(73) Assignee: Valeo Securite Habitacle, Creteil (FR)

( * ) Notice: Subject to any disclaimer, the term of this patent is extended or adjusted under 35 U.S.C. 154(b) by 0 days.

(21) Appl. No.: 09/457,866

(22) Filed: Dec. 10, 1999

(30) Foreign Application Priority Data

Dec. 21, 1998 (FR) .............................. 98 16107

(51) Int. Cl.[7] .................................................. G08G 1/01
(52) U.S. Cl. ...................... 340/941; 340/825; 340/854; 342/44; 343/742; 343/867
(58) Field of Search ................................ 340/941, 854, 340/825; 455/41; 324/247; 342/44, 371, 372, 375; 343/742, 867

(56) References Cited

U.S. PATENT DOCUMENTS

| 4,131,896 A | * | 12/1978 | Miller ........................ 343/815 |
| 4,812,812 A | * | 3/1989 | Flowerdew et al. ........ 340/854 |
| 4,967,695 A | * | 11/1990 | Giunta ........................ 119/29 |
| 5,495,229 A | * | 2/1996 | Balch et al. ................. 640/551 |
| 5,559,385 A | * | 9/1996 | Yalovega et al. ............ 310/198 |
| 5,561,430 A | * | 10/1996 | Knebelkamp ................. 342/44 |
| 5,784,031 A | * | 7/1998 | Weiss et al. ................. 342/373 |
| 5,917,455 A | * | 6/1999 | Huynh et al. ............. 343/792.5 |
| 5,966,641 A | * | 10/1999 | Flowerdew ................... 455/41 |
| 6,134,420 A | * | 10/2000 | Flowerdew et al. .......... 455/41 |
| 6,204,810 B1 | * | 3/2001 | Smith ......................... 342/365 |

FOREIGN PATENT DOCUMENTS

| DE | 36 27 193 A1 | 2/1987 |
| WO | WO 98/07244 | 2/1998 |
| WO | WO 98/20626 | 5/1998 |

* cited by examiner

Primary Examiner—Jeffery Hofsass
Assistant Examiner—Phung Nguyen
(74) Attorney, Agent, or Firm—Connolly Bove Lodge & Hutz LLP

(57) ABSTRACT

The invention relates to a device for low-frequency communication by magnetic coupling of the type comprising a magnetic field emitter and a receiver placed in an identification member, one of either the emitter or the receiver being furnished with a loop antenna, in which the other of either the emitter or the receiver is constituted by the association of three coils (1, 2, 3) wound around three perpendicular axes (Ox, Oy, Oz) defining a trihedral so as to obtain an omnidirectional magnetic field by supplying said coils with currents of like frequency.

20 Claims, 2 Drawing Sheets

Figure 1:
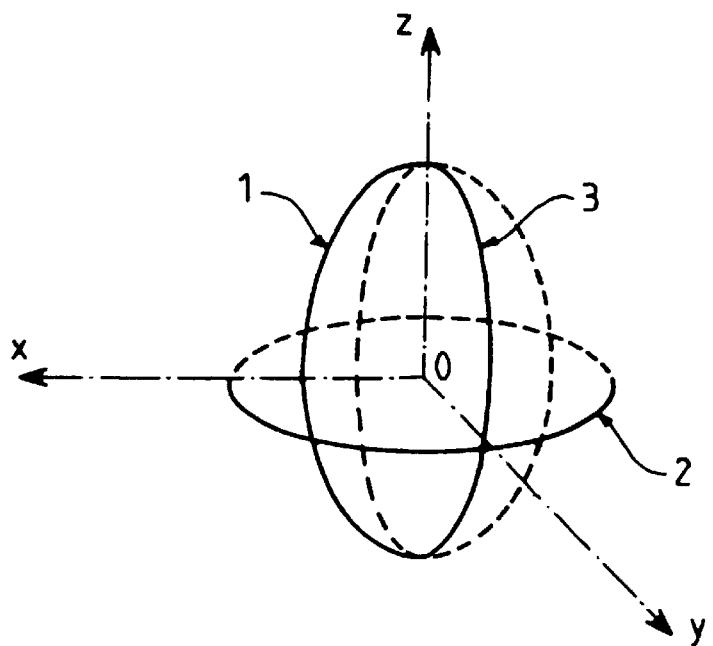

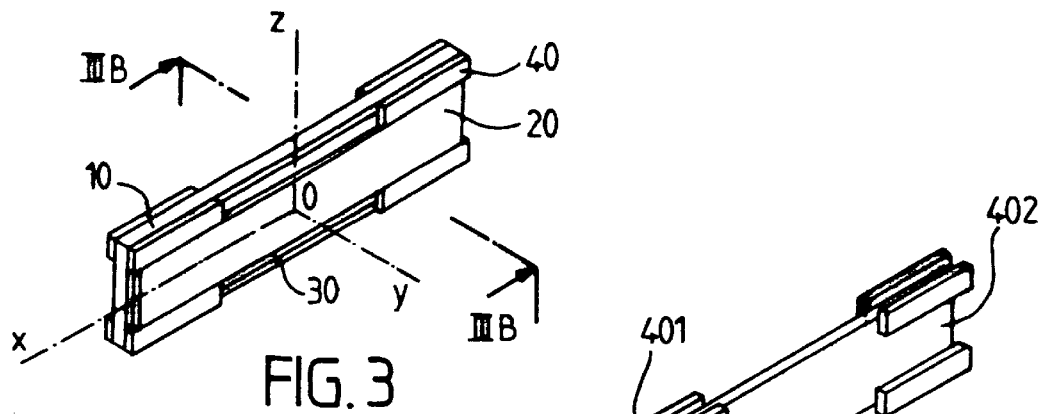
FIG. 3
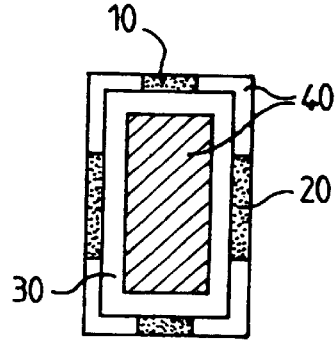
FIG. 3B
FIG. 3A
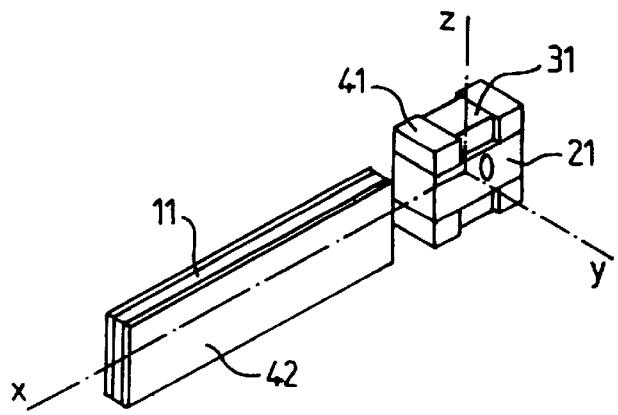
FIG. 4
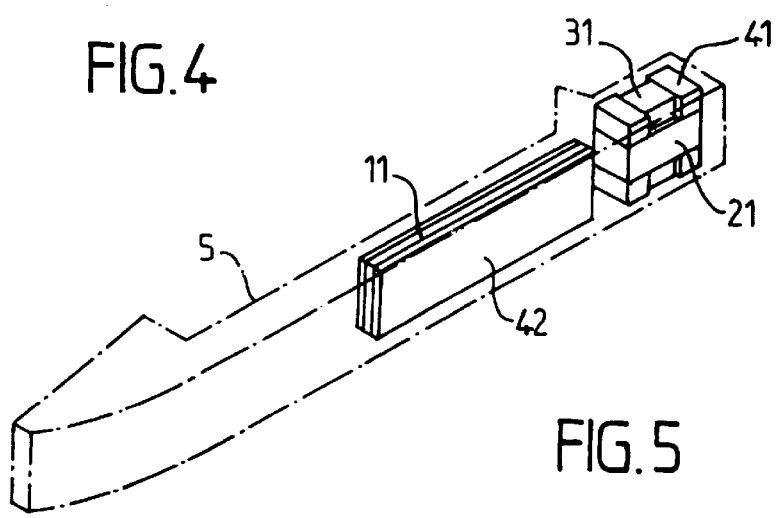
FIG. 5

DEVICE FOR LOW-FREQUENCY COMMUNICATION BY MAGNETIC COUPLING

The subject of the present invention is a device for low-frequency communication by magnetic coupling between emission by magnetic field and a reception antenna.

In a more particular manner, the emission antenna can be disposed on a vehicle and the reception antenna in an identification member such as a tag or a plate of the credit card kind, thus allowing identification between said member and the vehicle and hence, thereafter, the exploitation of any desired control signal such as the unlocking of the doors or the switching on of the headlights or else the remote starting of the engine, when it is necessary to heat it in advance as is the case in cold countries.

It is known, in particular through the patent application JP-62-148044 held by the "NISSAN MOTOR COMPANY", to dispose in the door of a vehicle two loop antennas oriented at 90° to one another so as to obtain a magnetic field in two directions in space, thereby making it possible to have on the tag merely a reduced antenna which can have the dimension of a credit card.

The drawback of this device is that as the emission magnetic field emits in two dimensions only, it follows that, in certain positions of the receiver tag, the latter does not receive the signal, so that there is no communication between the car and the tag.

The first objective of the present invention is to eliminate this drawback by creating an omnidirectional emission magnetic field by the association of three coils according to the three axes in space.

The second objective of the present invention relates to the support devices for such three associated coils.

The invention therefore relates to a device for low-frequency communication by magnetic coupling of the type comprising a magnetic field emitter and a receiver placed in an identification member, one of either the emitter or the receiver being furnished with a loop antenna, characterized in that the other of either the emitter or the receiver is constituted by the association of three coils wound around three substantially perpendicular axes defining a trihedral so as to obtain an omnidirectional magnetic field by supplying said coils with currents of like frequency.

Advantageously, the omnidirectional magnetic field is generated by supplying the three coils with currents which are out of phase by about 60° or 120°.

The three coils can be wound on one another on a common core for the three coils. The three coils of the emitter can be disposed on one and the same spherical core; this core can also be a parallelepiped around the six faces of which are wound the three coils; in one variant, this core forms a parallelepipedal lamina of small thickness, one of the coils being wound breadthwise across the core, in the vicinity of its middle part, the second coil being wound around the two longest large faces of the core and the third being wound on the small-thickness edge of the core.

Provision may also be made for the three coils to be wound on two separate cores; one of the cores has, for example, an approximately cubic shape and the other has, for example, the shape of a lamina of relatively small thickness, one of the coils being wound on the edge of the lamina of small-thickness, the other two being crossed at 90° on the core of approximately cubic shape.

According to a preferred embodiment, the magnetic field emitter is constituted by the association of the three coils and is incorporated into a vehicle, and the receiver consisting of the loop antenna is incorporated into the identification member; as a variant, the magnetic field emitter, consisting of a loop antenna, is incorporated into a vehicle and the receiver constituted by the association of the three coils is incorporated into the identification member; the identification member and its antenna can be substantially planar.

Advantageously, the core(s) consists (consist) of a magnetic material, but it (they) could also consist of a material which is transparent from the magnetic point of view. The core(s) comprises (comprise), preferably, recesses for positioning and housing the coils of the emitter.

Figure 2:
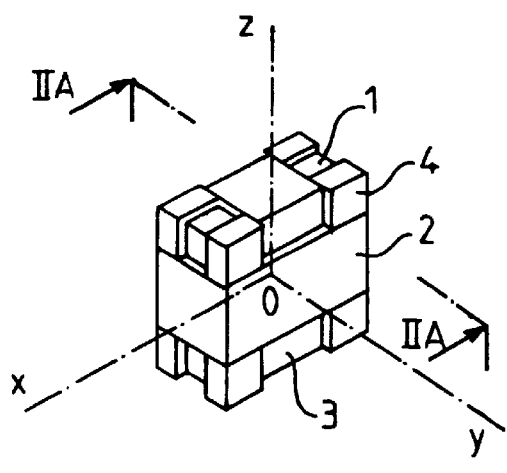
Figure 2A:
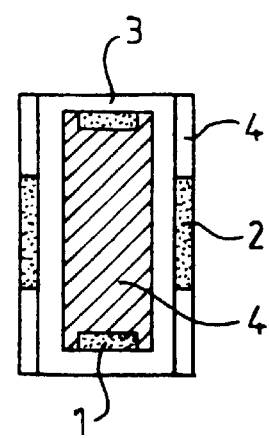

By way of non-limiting examples and to facilitate the understanding of the invention, represented in the appended drawing are:

FIG. 1: a purely geometrical representation illustrating the respective positions, in space, of the three coils making it possible to have an omnidirectional emission pattern;

FIG. 2: a perspective view of a first embodiment of a device carrying three coils at 90° coiled on one another on a parallelepiped;

FIG. 2A: a section through IIA—IIA of FIG. 2;

FIG. 3: a perspective view of a second embodiment of the device according to the invention, the core being a parallelepipedal lamina;

FIG. 3A: a perspective view of the lamina of FIG. 3 without its coils;

FIG. 3B: a section through IIIB—IIIB of FIG. 3;

FIG. 4: a perspective view of a third embodiment of the device according to the invention embodied with two separate cores;

FIG. 5: a perspective view showing the device of FIG. 4 installed in a motor vehicle door handle.

FIG. 1 is a geometrical view illustrating the disposition in space of the three coils, each being represented by a circle.

The coil 1 is in a vertical plane and has axis Oy; the coil 2 is in a horizontal plane perpendicular to the first and has axis Oz; the coil 3 is in a vertical plane, perpendicular to the previous two, and has axis Ox. The three axes Ox, Oy and Oz form a trihedral.

The three coils 1, 2 and 3 are traversed by currents of like frequency and are 120° or 60° out of phase. An omnidirectional emission magnetic field is thus obtained.

The three coils of the emitter can be carried by one and the same spherical core; by way of example, the core can have a diameter of 70 mm; each coil can comprise 150 turns of enameled copper wire 0.15 mm in diameter; the frequency of the supply current is 125 kHz; the supplies are 120° out of phase by virtue of a shift register.

The three coils can be carried by one and the same support or core or by different supports (or cores). In FIGS. 2 and 3, they are on a common support; in FIG. 4, they are placed on two separate supports.

In all the embodiments of the device according to the invention, these supports or cores can be constructed either from a material which is transparent from the magnetic point of view, or from a magnetic material such as ferrite or plastoferrite. The use of a plastoferrite is preferable because this material is easily machinable and because, having a relative initial magnetic permeability of greater than one, it increases the magnetic field radiated for one and the same size of coil.

FIG. 2 is a perspective view of a first embodiment. The core 4 is an almost cubic parallelepiped. The coil 1, with axis Oy, is installed first; next coil 3, with axis Ox is wound on the first, at 90° and lastly coil 2 with axis Oz. The core 4 comprises recesses for positioning and housing the coils in such a way that the faces of the emitter exhibit no excess thickness.

FIG. 3 represents a variant in which the core is a parallelepipedal lamina 40 of relatively small thickness.

The coil 30, with axis Oz, is firstly wound on the middle part of the lamina 40 constituting the core, breadthwise across this core; next the coil 20 with axis Oz is wound along the two longest large faces of the lamina 40; and, finally, the coil 10, with axis Oy, is wound above the others on the small-thickness edge of the lamina 40. The lamina 40 comprises recesses 401, 402, 403 for positioning and housing the coils 10, 20 and 30 respectively on the core, as represented in FIG. 3A. The lamina 40 can consist of a single machined block or can be formed by fitting, on a strictly parallelepipedal bar, one or two adapters at each end of the bar; when two adapters are used at each end, the four adapters are identical pieces which are simple to machine.

FIG. 4 represents a variant according to which the three coils are distributed over two cores 41 and 42. The core 41 has a similar shape to that of the core 4 of FIG. 2. Two coils only are wound thereon: firstly the coil 31 with axis Ox and, thereafter, on top, the coil 21 with axis Oz. The core 42, separate from the core 41, has the shape of an elongate lamina similar to the shape of the core of FIG. 3: a single coil is wound thereon, the coil 11 with axis Oy. As in the case of FIG. 3, this coil 11 is wound on the small-thickness edge of the lamina 42. The cores 41 and 42 comprise recesses similar to those of the cores 4 and 40 so as to avoid excess thicknesses.

This disposition according to FIG. 4 allows easy installation of three coils in the handle 5 of a motor vehicle door. The core 42, of elongate shape, is easily placed in the flat blade which constitutes the door handle of the vehicle, whilst the more compact core 41 is housed at the end of the hinge of the handle.

It is quite obvious that, without departing from the field of the invention, it is possible to swap the position of the pieces: a magnetic field receiver with three coils being held between the hands of the user, in the fob of a key ring for example, an emitter with single-loop antenna being at any appropriate location in the vehicle.

What is claimed is:

1. A device for low-frequency communication by magnetic coupling, comprising:
   an emitter placed in a vehicle; and
   a receiver placed in an identification member, wherein one of the emitter or the receiver includes a loop antenna, the other of the emitter or the receiver includes three associated coils wound around three perpendicular axes defining a trihedral and creating an omnidirectional magnetic field, and the three associated coils are supplied with currents of like frequency, 60 degrees or 120 degrees out of phase relative to each other.

2. A device according to claim 1, wherein the three associated coils are wound on one another around six faces of a parallelepiped, common core.

3. A device according to claim 2, wherein the three associated coils are wound on one another around six faces of a core comprising a parallelepiped lamina, a first associated coil being wound breadthwise around a middle portion of the core, a second associated coil being wound around two longest faces of the core, and a third associated coil being wound around edges of the core.

4. A device according to claim 1, wherein the three associated coils are wound on two separate cores, a first core having approximately a cubic shape and a second core having a lamina shape of relatively small thickness, one of the three associated coils being wound around edges of the second core, and the other two associated coils being crossed at 90 degrees around the first core.

5. A device according to claim 1, wherein the emitter includes the three associated coils, and the receiver includes the loop antenna.

6. A device according to claim 1, wherein the emitter includes the loop antenna, and the receiver includes the three associated coils.

7. A device according to claim 1, wherein the identification member and its antenna are substantially planar.

8. A device according to claim 2, wherein the core comprises a magnetic material.

9. A device according to claim 1, wherein the emitter includes the three associated coils disposed on a common spherical core.

10. A device according to claim 2, wherein the emitter includes the three associated coils, and the core comprises recesses for positioning and housing the three associated coils.

11. A device according to claim 2, wherein the emitter includes the three associated coils, and the receiver includes the loop antenna.

12. A device according to claim 3, wherein the emitter includes the three associated coils, and the receiver includes the loop antenna.

13. A device according to claim 4, wherein the emitter includes the three associated coils, and the receiver includes the loop antenna.

14. A device according to claim 2, wherein the emitter includes the loop antenna, and the receiver includes the three associated coils.

15. A device according to claim 3, wherein the emitter includes the loop antenna, and the receiver includes the three associated coils.

16. A device according to claim 4, wherein the emitter includes the loop antenna, and the receiver includes the three associated coils.

17. A device according to claim 2, wherein the identification member and its antenna are substantially planar.

18. A device according to claim 3, wherein the identification member and its antenna are substantially planar.

19. A device according to claim 4, wherein the identification member and its antenna are substantially planar.

20. A device according to claim 5, wherein the identification member and its antenna are substantially planar.

* * * * *